(12) United States Patent
Saeki

(10) Patent No.: US 7,051,869 B2
(45) Date of Patent: May 30, 2006

(54) BEADED CONVEYOR BELT

(75) Inventor: Naoyuki Saeki, Yamatokohriyama (JP)

(73) Assignee: Nitta Corporation, Osaka (JP)

(*) Notice: Subject to any disclaimer, the term of this patent is extended or adjusted under 35 U.S.C. 154(b) by 0 days.

(21) Appl. No.: 10/979,416

(22) Filed: Nov. 2, 2004

(65) Prior Publication Data
US 2005/0061632 A1    Mar. 24, 2005

Related U.S. Application Data

(62) Division of application No. 10/476,031, filed as application No. PCT/JP02/04502 on May 8, 2002.

(30) Foreign Application Priority Data

May 11, 2001   (JP)  ............................ 2001-141521

(51) Int. Cl.
B65G 15/02   (2006.01)
(52) U.S. Cl. .................................................. 198/831
(58) Field of Classification Search ............... 198/831, 198/813, 837
See application file for complete search history.

(56) References Cited

U.S. PATENT DOCUMENTS

| | | | | |
|---|---|---|---|---|
| 3,217,861 A | * | 11/1965 | Daniluk et al. | 198/816 |
| 3,561,587 A | * | 2/1971 | Schausten | 198/831 |
| 3,838,767 A | * | 10/1974 | Taylor | 198/815 |
| 3,901,379 A | | 8/1975 | Bruhm | |
| 4,766,994 A | * | 8/1988 | Miller | 198/711 |
| 4,799,424 A | * | 1/1989 | Stabler | 100/154 |
| 5,332,083 A | * | 7/1994 | Axmann | 198/831 |
| 5,839,570 A | * | 11/1998 | Vertogen et al. | 198/831 |
| 5,984,084 A | * | 11/1999 | Osaka et al. | 198/831 |
| 6,564,931 B1 | * | 5/2003 | Edelmann | 198/831 |
| 6,843,366 B1 | * | 1/2005 | Shiotani | 198/831 |
| 6,866,141 B1 | * | 3/2005 | Saeki | 198/844.2 |

FOREIGN PATENT DOCUMENTS

| | | |
|---|---|---|
| JP | S53-69990 | 6/1978 |
| JP | S54-37690 | 3/1979 |
| JP | S56-10413 | 1/1981 |

(Continued)

OTHER PUBLICATIONS

International Search Report of International Application No. PCT/JP02/04502 mailed on Aug. 27, 2002.

Primary Examiner—Joe Dillon, Jr.
(74) Attorney, Agent, or Firm—Darby & Darby

(57) ABSTRACT

The beads of a beaded conveyor belt for a curve conveyor are constituted by a number of bead constituting bodies (2b) that are disposed over the entire periphery of the outer surface along the outer peripheral edge of a belt main body (2a) and that are narrow in the direction of the length of the belt. Further, the beads of a beaded conveyor belt for a liner conveyor are constituted by a number of bead constituting bodies (7b) that are disposed over the entire periphery of the outer surface along opposite side edge of a belt main body (7a) and that are narrow in the direction of the length of the belt. The conveyor belt is installed taut between straight type end rollers (15), and the width of the bead constituting bodies (2b, 7b) lengthwise of the belt is set at about 20–60% of the diameter of the straight type end rollers (15). Even when the conveyor belt is installed taut between small-diameter end rollers, long-term use is possible.

9 Claims, 16 Drawing Sheets

FOREIGN PATENT DOCUMENTS

| | | |
|---|---|---|
| JP | S62-26310 | 2/1987 |
| JP | S62-128008 | 8/1987 |
| JP | H01-156214 | 6/1989 |
| JP | H04-65208 | 6/1992 |
| JP | H05-49721 | 6/1993 |
| JP | H08-231016 | 9/1996 |

* cited by examiner

BEADED CONVEYOR BELT

CROSS-REFERENCE TO PRIOR APPLICATION

This is a divisional application of U.S. application Ser. No. 10/476,031, filed Oct. 23, 2003 which claims the benefit of priority of a U.S. National Phase Application under 35 U.S.C. §371 of International Patent Application No. PCT/JP02/04502 filed May 8, 2002, and claims the benefit of Japanese Patent Application No. 2001-141521 filed May 11, 2001 which are incorporated by reference herein. The international application was published in Japanese on Nov. 21, 2002 as WO 02/092476 a1 under pct article 21(2).

FIELD OF THE INVENTION

The present invention relates to a conveyor belt with bead used in a curved conveyor or a straight conveyor.

PRIOR ART

A curved conveyor, as illustrated in FIG. 14, is generally formed by stretching a conveyor belt 90 between end rollers 92 and 92 disposed rotatably at a certain angle and provided on a conveyor body 91. The conveyor belt 90 is shown in FIG. 15. A urethane rubber bead 93 is sewed together with the outer hem area. In order to prevent the inward shift due to the centripetal force during the rotation, the bead 93 is engaged with a guide members 94 attached to the conveyor body 91. The guide member of this type is generally disposed as shown in FIG. 15. A pair of bearings BR and BR is attached to a block B in a fashion that they are symmetrically inclined with respect of the horizontal plane. And a thick portion 93a of the bead 93 is held between the bearings BR and BR.

During the rotation of this conveyor belt, the bead 93 is affected by bending force at the time of configuration change along with the outer peripheral configuration of the end roller 92, and thereby causing crack and/or breakage on the thick portion 93a of the bead 93 in a relatively short time period. The smaller the diameter of the end roller 93 is, the more conspicuous occurrences of such crack and/or breakage are. The occurrence of crack and/or breakage of the bead means destruction of the conveyor belt 90.

In a straight conveyor in which beads are sewed to both hem sides for prevention of meander of the belt, if the end roller has a small diameter, crack and/or breakage will occur in a relatively short time period.

Therefore in the field handling conveyor belts of this type, there has became a serious demand for a conveyor belt with bead in which crack and/or breakage of beads will not occur for a long time period even if a conveyor belt is stretched between small diameter end rollers, and which will withstand the use for a long time period.

Therefore, it is an object of the present invention to provide a conveyor belt with bead which may be usable for a long time period even if a conveyor belt is stretched between small diameter end rollers.

SUMMARY OF THE INVENTION

An aspect of the present invention is a conveyor belt with bead for a curved conveyor having a belt body and a bead member. The belt is stretched between two small-diameter straight end rollers disposed at a certain angle, and the bead member is formed with a plurality of narrow bead composing elements which are disposed along an entire peripheral edge portion of the belt body. The width of each bead composing elements in a forwarding direction is as narrow as 20 to 60% of the straight end rollers.

Another aspect according to the present invention is a conveyor belt with bead for a straight conveyor having a belt body and a bead member. The belt is stretched between two small-diameter straight end rollers disposed in parallel, and the bead member is formed with a plurality of narrow bead composing elements which are disposed along entire edge portions at both sides of the belt body. The width of each bead composing elements in a forwarding direction is as narrow as 20 to 60% of the straight end rollers.

Any adjacent bead composing elements of the bead member may be disposed separately, or connected through a thin piece.

Furthermore, each of the bead composing elements may have a thick portion for preventing inward shift of the belt body by engaging with a bar guide member provided on the body of the conveyor.

The small-diameter end roller may have a diameter of about 15 to 30 mm.

The above and other objects, features and advantages of the present invention will be apparent from the following description read in conjunction with the accompanying drawings, in which like reference numerals designate the same elements.

DETAILED DESCRIPTION OF THE INVENTION

Figure 1:
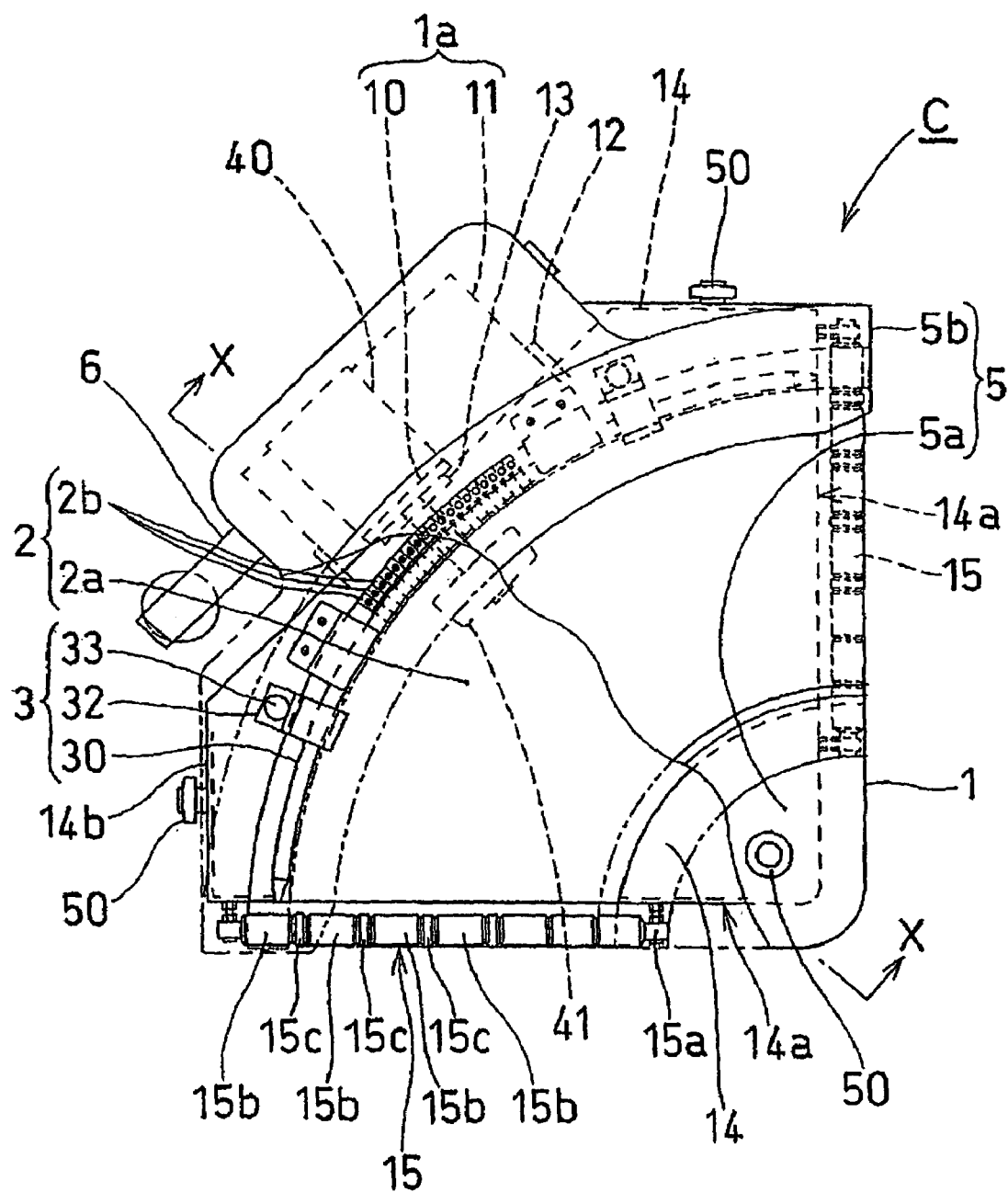
FIG. 1 is a plan view of a curved conveyor employing a conveyor belt with bead according to an embodiment of the present invention.
Figure 2:
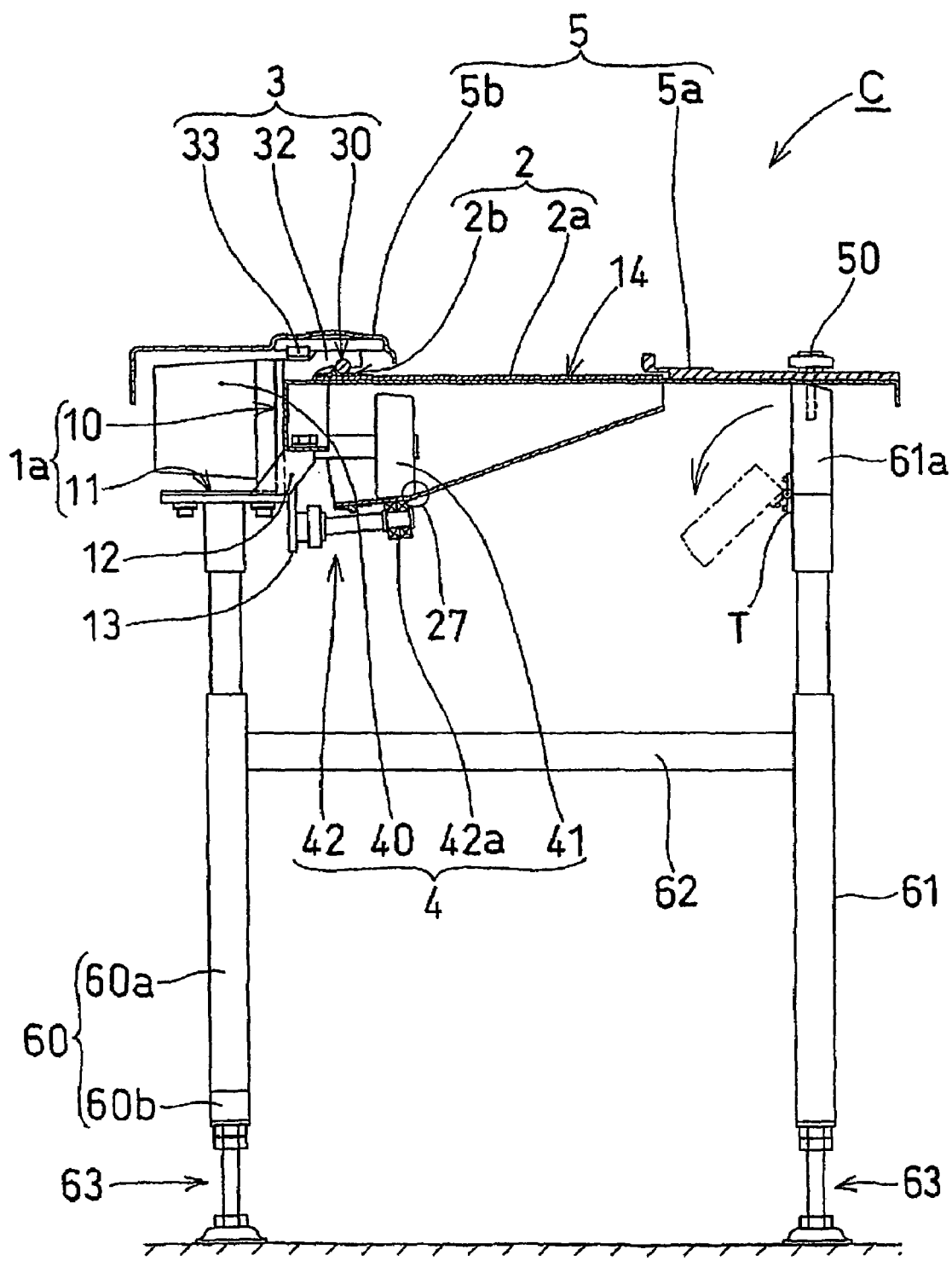
FIG. 2 is a sectional view taken along line X—X of FIG. 1.

FIG. 1 shows a plan view of a conveyor C which employs a conveyor belt 2 with bead according to this invention. FIG. 2 is a sectional view taken along the line X—X in FIG. 1, and FIG. 3 is a bottom view of the conveyor C.

Figure 3:
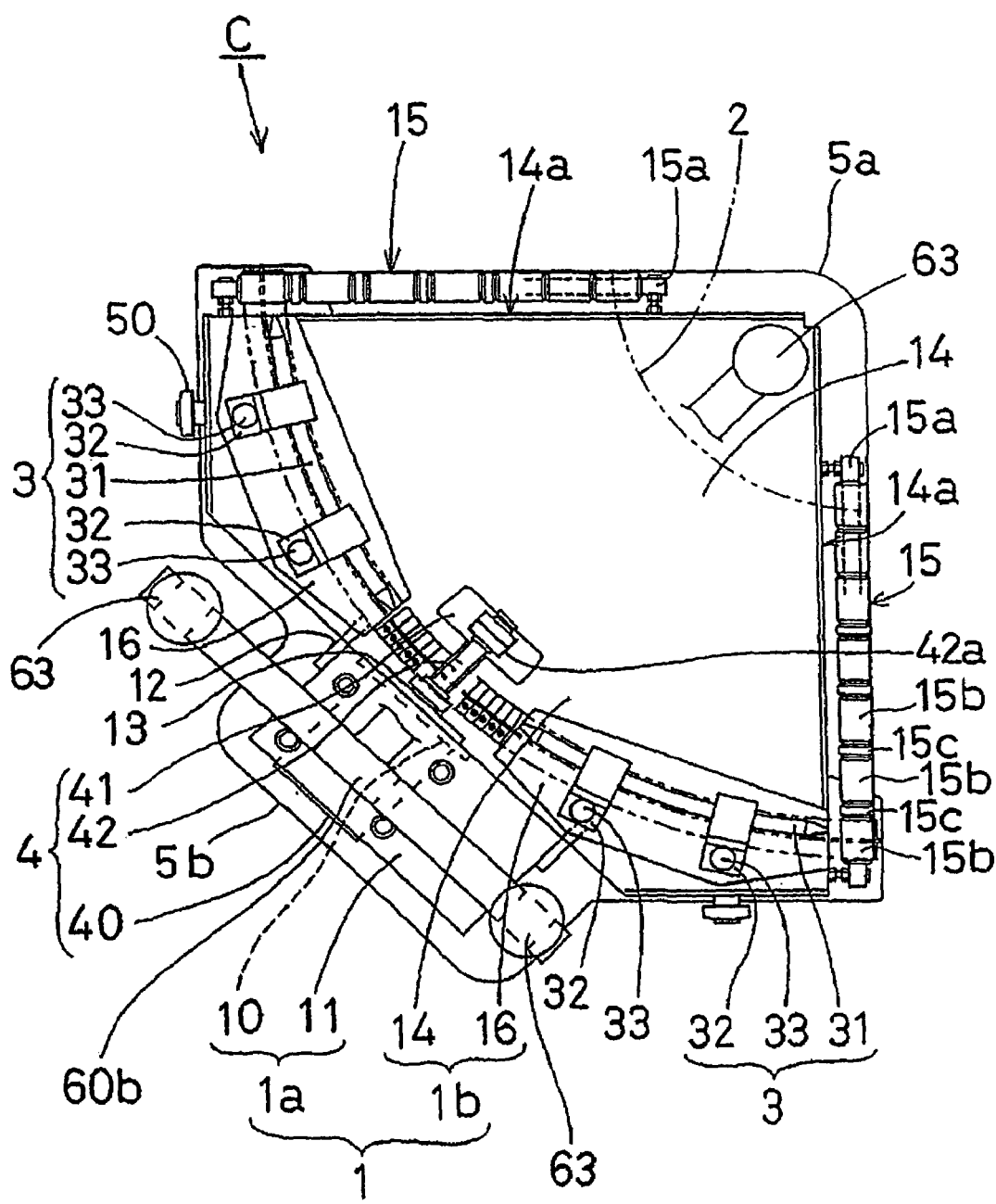
FIG. 3 is a bottom view of the belt conveyor.

A basic constitution of this conveyor C is shown in FIGS. 1 to 3. The conveyor C includes a conveyor main body 1, a conveyor belt 2 with bead (hereinafter sometimes referred to as "beaded conveyor belt") stretched on the conveyor main body 1, a shift prevention member 3 for preventing the beaded conveyor belt 2 from shifting inwardly, a driving member 4 for rotationally driving the beaded conveyor belt 2. The conveyor C also includes a cover member 5 which covers a motor 40 with a decelerator for the driving member 4, the shift prevention member 3 on the upper side and an inner and an outer peripheral portion of the beaded conveyor belt 2, and a leg member 6 which keeps the conveyor main body 1 at a suitable height. These main parts of the conveyor C will be described in detail below.

The conveyor main body 1, as shown in FIG. 1, includes a motor support element 1a, and a belt support element 1b bolted to the motor support element 1a.

As shown in FIGS. 2 and 3, the motor support element 1a is composed of a motor mounting plate 10 and a base plate 11 provided on the upper end of the leg member 6, and formed in an L-shape in a side view. The base plate 11 has bracket portions 12 at both end portions thereof. The motor mounting plate 10 has a unit mounting plate 13 in the side of the belt support element 1b.

Figure 4:
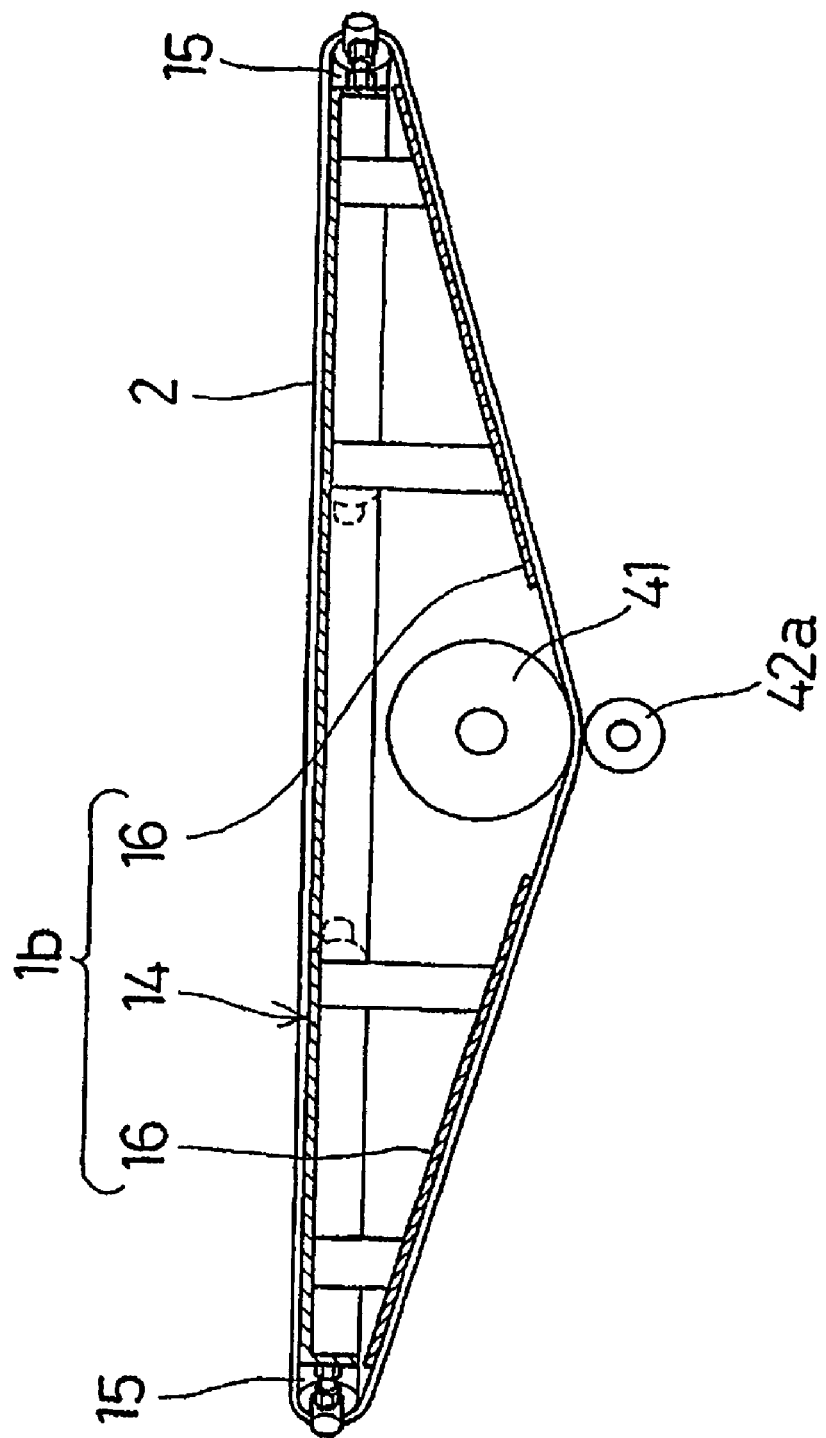
FIG. 4 is a view showing a state in which the conveyor belt with bead is stretched between the end rollers in the belt conveyor.

As shown in FIGS. 1, 3 and 4, the belt support element 1b includes a belt mounting plate 14 and two belt guide plates 16 and 16 which are fixed with a lower face of the belt mounting plate 14 through brackets. As clearly seen in FIG. 2, the belt mounting plate 14 is bolted to the bracket portion 12. The belt mounting plate 14, as clearly seen in FIG. 1, is formed in a pentagonal shape in a plan view. Bent pieces 14a and 14a provided at an angle of 90 degrees respectively receive straight end rollers 15 and 15 having a diameter of approximately 15 to 30 mm. As shown in FIGS. 1 and 3, the end roller 15 includes a stainless steel axial piece 15a bolted to the bent piece 14a and plural resin rollers 15b are attached rotatably on the axial piece 15a. A bearing 15c (which has the same diameter as or a little larger diameter than the outer diameter of the roller 15b) is interposed between the resin rollers 15b and 15b provided near the outer peripheral side of the belt.

Figure 7:
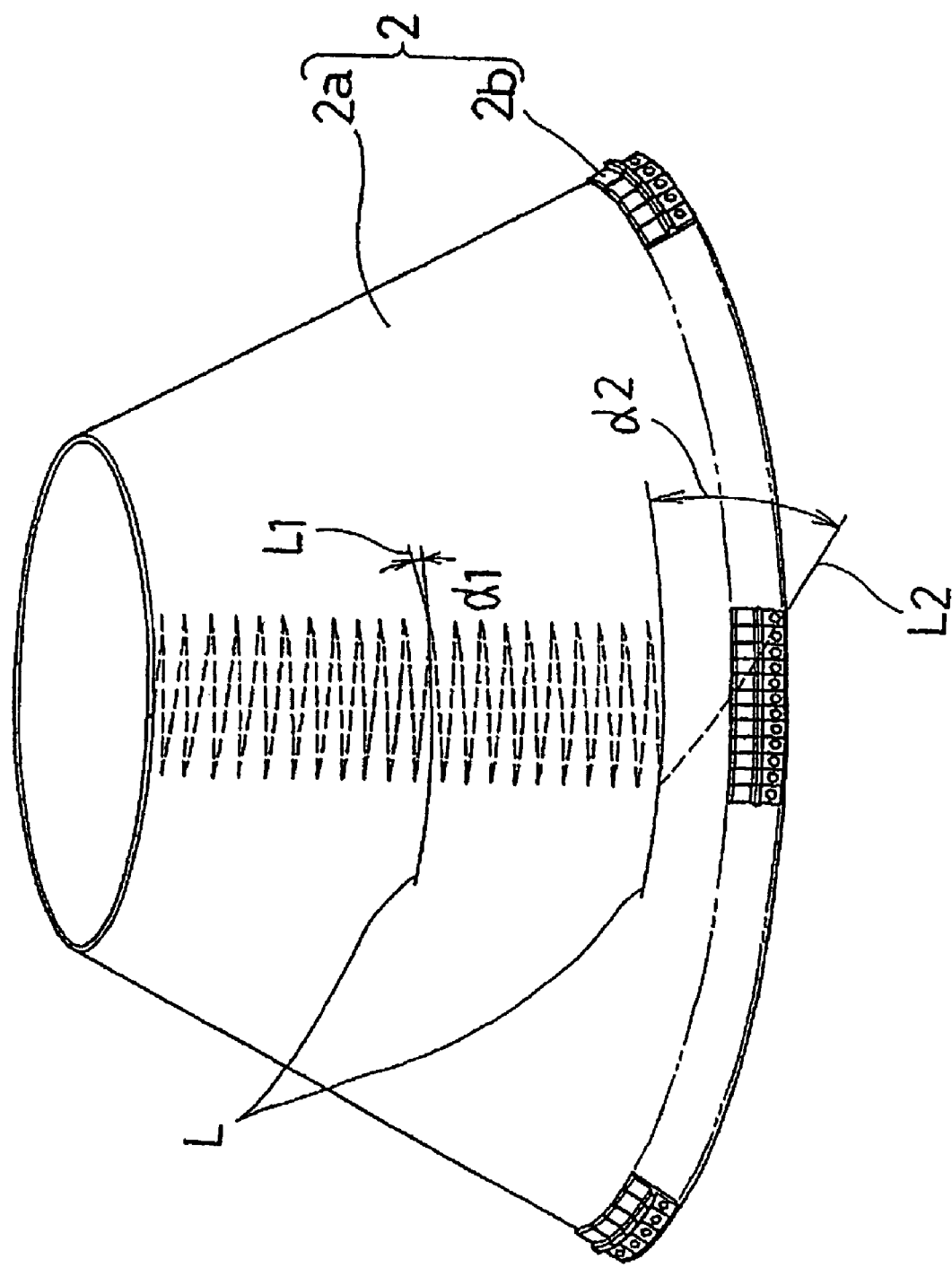
FIG. 7 is a perspective view of the conveyor belt with bead.

The conveyor belt 2 with bead is illustrated in FIGS. 1 and 7. It includes a belt body 2a and a number of bead composing elements 2b disposed across an entire outer peripheral end of the belt body 2a. Each bead composing element 2b has a narrow width.

Figure 6:
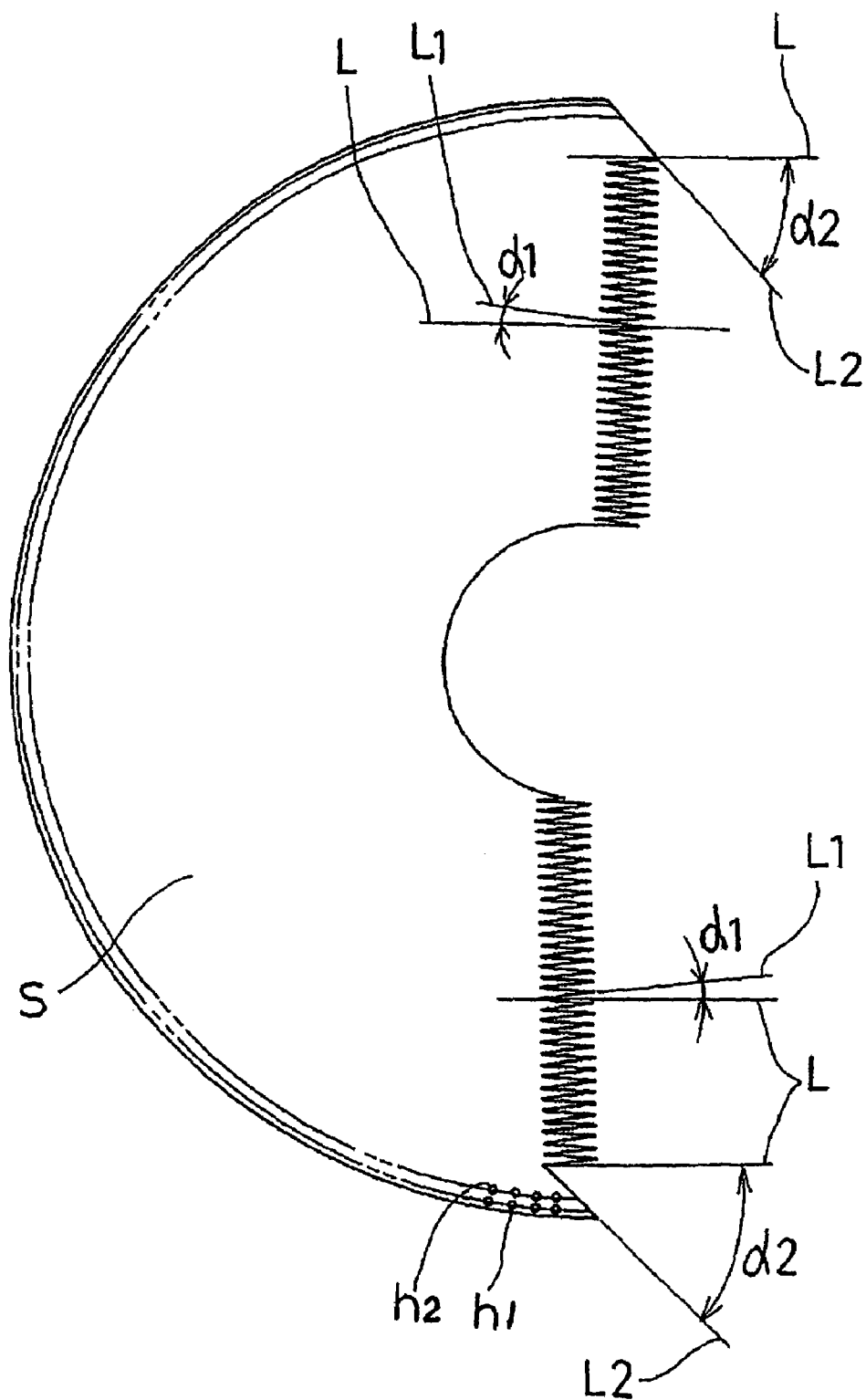
FIG. 6 is a plan view of a sheet for forming a belt body.

The belt body 2a has a polyester sail cloth as a core body thereof and a thermoplastic polyurethane as a surface material of a conveying face. Both ends of a fan-shaped sheet are joined to make a tapered tube shape as shown in FIG. 7. In general, the belt body 2a of this type is formed by joining both the ends of the fan-shape by a skiving joint or a step joint. This causes to increase the manufacturing cost, the number of the manufacturing steps and the thickness of the joining part. In order to prevent these drawbacks, here in the present invention, the belt body 2a is manufactured in the following manners (1) and (2):

(1) As shown in FIG. 6, a sheet S which has a polyester sail cloth as a core body and a thermoplastic polyurethane as a surface material of a conveying face is punched out into a fan shape with a Thompson blade. The sheet punched as such has radial end portions to be joined together. Each of the end portions is formed in a series of finger-like protrusions extending from the inner peripheral end up to near the outer peripheral end, and each of fingers or finger-like protrusions has a narrow angle tip (an angle $\alpha 1$ between a cut line L1 of the finger and a contact line L to the belt peripheral direction line is small). The part from the portion to be caught and held by the driving roller 41 and the pinch roller 42a and the vicinity thereof up to the outer peripheral end is formed with one cut line L2 having a large angle $\alpha 2$ with respect to the contact line L to the belt peripheral direction line. Furthermore, as shown in FIGS. 6 and 8, a number of through holes h1 and h2 for attaching a number of bead composing elements 2b are provided near the outer peripheral end of the belt body 2a of the sheet S.

The sail cloth and the surface material of the sheet to form the belt body 2a are not limited to the above. The cut line L2 may be curved.

(2) The end portions of the sheet S to be joined together are meshed with each other as shown in FIG. 7. And a urethane sheet is applied on the thermoplastic polyurethane on the finger jointed part and heat and pressure are applied thereon. In consequence, urethane of the urethane sheet is melt to infiltrate into gaps present between the joining edges, so that the ends of the sheet S are joined together.

Figure 8:
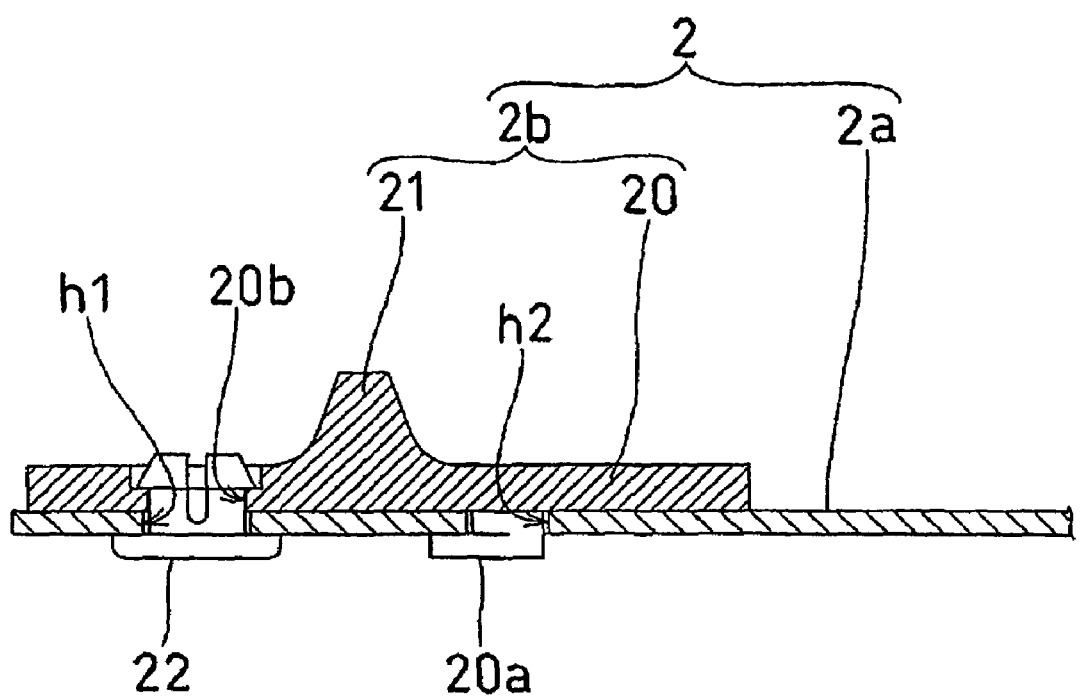
FIG. 8 is a sectional view showing a state in which a bead composing element is attached on the belt body.

The bead composing element 2b, illustrated in FIG. 8, includes a rectangular plate portion 20 and a thick portion 21 (or a projecting portion) provided on a longitudinal center portion of the plate portion 20 which has a substantially trapezoidal shape in a side view, and the portions 20 and 21 are integrally formed with synthetic resin or sintered metal. The plate portion 20 has an engaging part 20a at one side and an engaging hole 20b at the other side. When the bead composing element 2b is attached on the belt body 2a, the engaging part 20a is fit into the through-hole h2, while a pin 22 is fit into the through-hole h1 and the engaging hole 20b, so that the bead composing element 2b is fixed with the belt body 2a. Here, in the bead composing element 2b, for example, the plate portion 20 may have an 8.5 mm width in the forwarding direction at the outer peripheral edge side of the belt, an 8 mm width in the inner peripheral edge side thereof, and a length of 30 mm. Furthermore, the thick portion 21 may have a height of 4 mm and the side face thereof has a 70° inclination angle.

Figure 9:
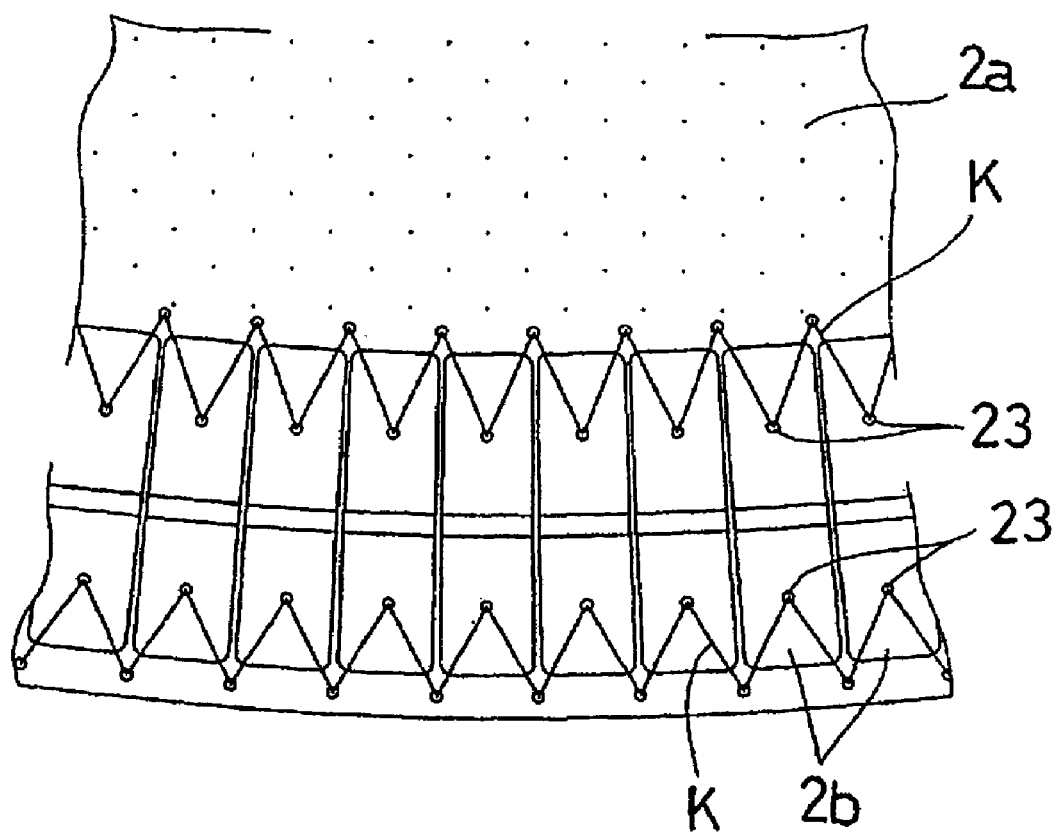
FIG. 9 is a sectional view showing another method for attaching bead composing elements on the belt body.
Figure 10:
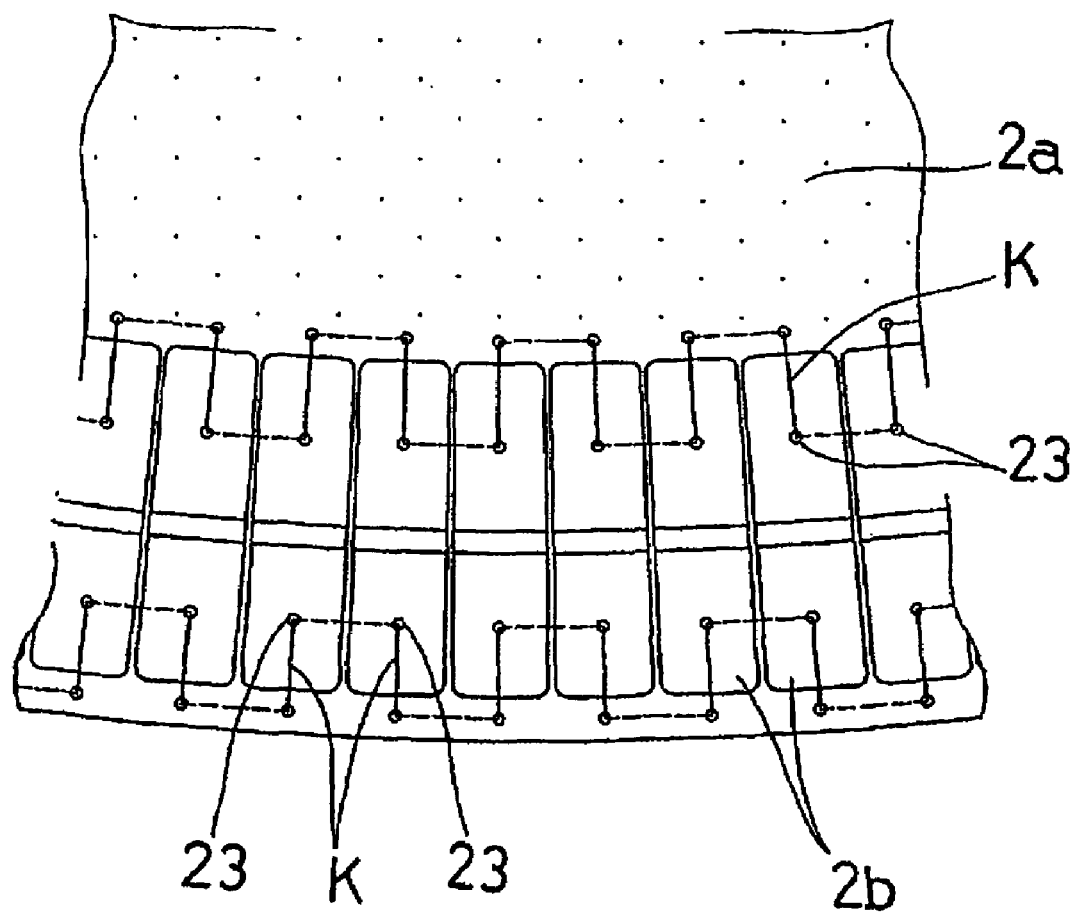
FIG. 10 is a sectional view showing another method for attaching bead composing elements on the belt body.
Figure 11:
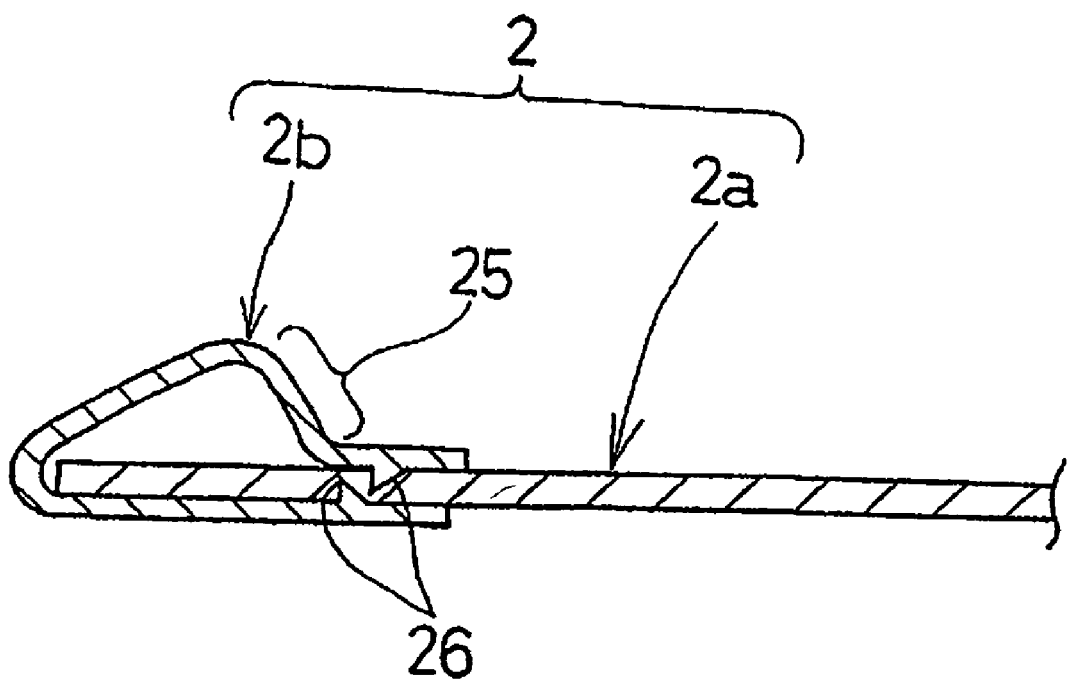
FIG. 11 is a sectional view showing another method for attaching another bead composing element on the belt body.

The way of attaching the bead composing element 2b to the belt main body 2a is not limitative to the above. As shown in FIGS. 9 and 10, the bead composing element 2b may be attached thereto with a thread K through a hole 23 formed on the bead composing element 2b. Furthermore, a pressed plate structure as shown in FIG. 11 may be used as the bead composing element 2b. In this bead composing element 2b, a steel plate is bent to make a slant surface 25 which is in contact with the guide members 30, 31 and 31. This pressed plate structure is attached to the belt main body 2a with a claw 26 which bites down the belt body 2a.

The bead composing element 2b may be applicable if the width in the belt forwarding direction is as approximately 20 to 60% narrow as the diameter of a straight end roller which has a small diameter.

Figure 12:
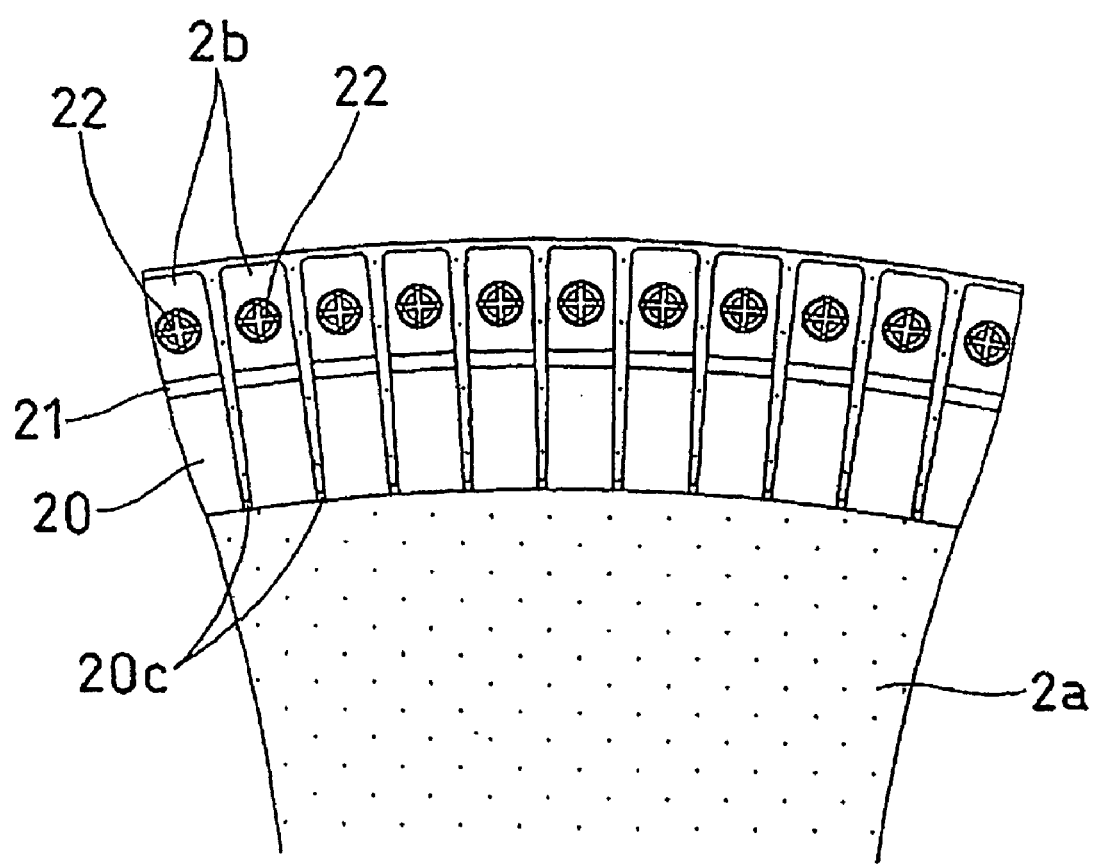
FIG. 12 is a plan view of bead composing elements according to another embodiment.

The adjacent bead composing elements 2b and 2b may be mutually joined together through an elastic bentable thin piece 20c (integrally formed), as shown in FIG. 12.

Then, the bead composing element 2b may be detachable from the belt body 2a as described above, or may also be fixed thereto.

The shift prevention member 3 is clearly illustrated in FIGS. 1 and 3. The shift prevention member 3 includes an upper side guide member 30, lower side guide members 31 and 31, a press member 32 and a screw 33. The press member 32 presses the upper side guide member 30 and the lower side guide members 31 and 31 against the slant surface of the thick portion 21 of the bead composing element 2b. The screw 33 is manually used for fixing the press member 32 with the upper side of the belt mounting plate 14 and the lower side of the belt guide plates 16 and 16.

Figure 5:
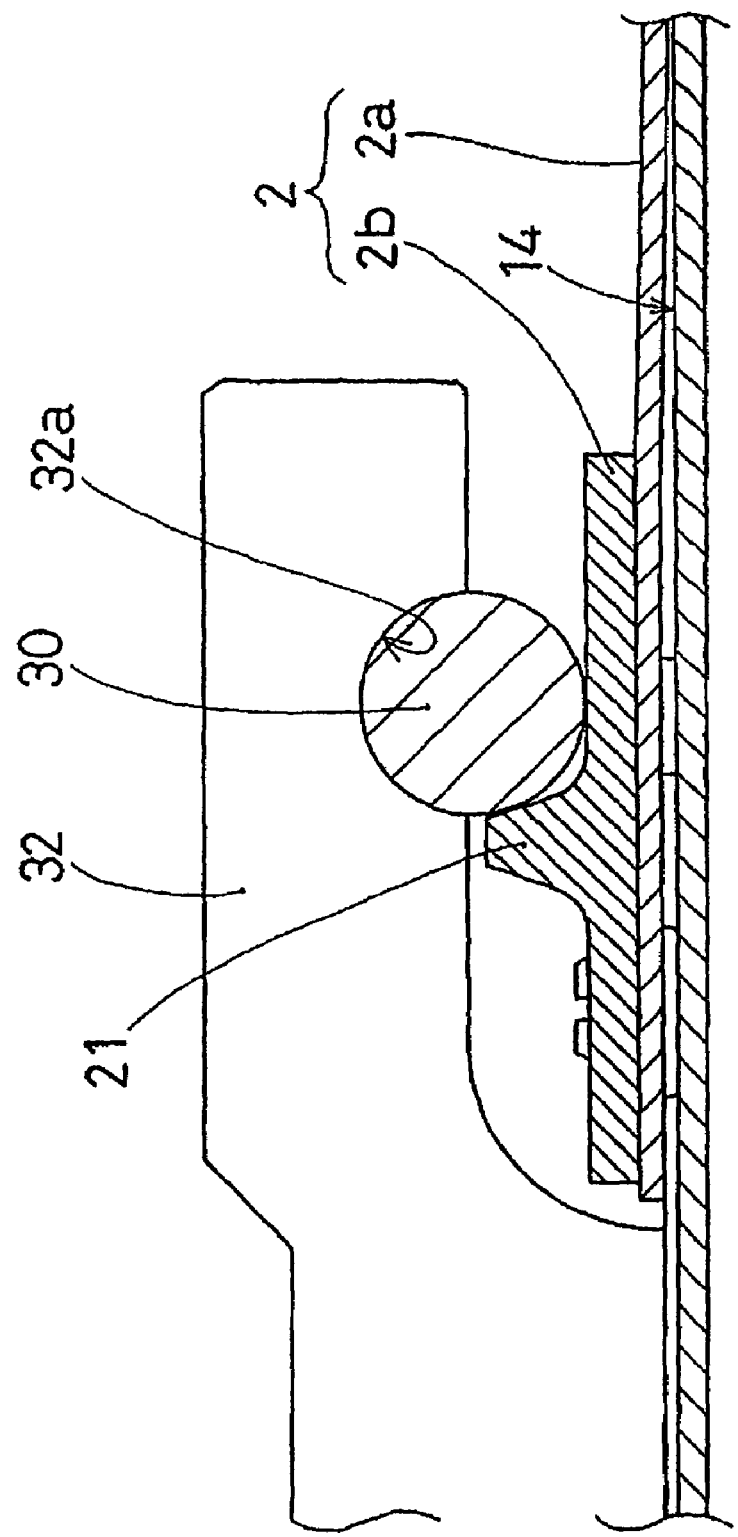
FIG. 5 is a sectional view showing a relation between a bead composing element and a shift prevention member employed in the belt conveyor.

The upper side guide member 30, shown in FIGS. 1 and 5, is provided on the upper side of the belt mounting plate 14 to prevent the inward shift of the belt. The upper side guide member 30 is formed of a round bar having shortly tapered ends at the both ends, and shaped in an arc as a whole with a curvature radius to contact with the inner side slant face of the thick portion 21.

The lower side guide members 31 and 31, as shown in FIG. 3, is located on the under side of the belt guide plate 16 to prevent the inward shift of the belt. The lower side guide members 31 and 31 are made of round bars with shortly tapered ends and formed in an arc shape with a curvature radius to contact with the inner side slant face of the thick portion 21. The guide member, here, is divided in two 31 and 31, different from the upper side guide member. This is because the driving roller 41 and the pinch roller 42a are located there, as shown in FIG. 3.

The material of the upper and lower guide members 30, 31 and 31 is determined with respect to the material of the bead composing element 2b. One of the former and the latter is synthetic resin, then the other of them must be metal. On the other hand, if one of them is sintered metal, the other may be metal.

The press member 32 is, as illustrated in FIG. 5, provided with a groove 32a with an arc section. FIG. 5 shows only the upper side guide member 30 and other parts therearound, however, the lower side guide members 31 and 31 and other parts therearound also have the same structure. The upper side of the upper guide member 30 and the lower sides of the lower guide members 31 and 31 are respectively received within the grooves 32a so that the guide members 30, 31 and 31 are positioned to stay therein in contact with the inner slant face of the thick portions 21.

The screw 33 is formed with a male screw fixed with a manually rotatable portion of a large diameter on one end. The upper side and the lower side guide members 30, 31 and 31 may be easily removed from the beaded conveyor belt 2 without using a tool, but only by grabbing and rotating the manually rotatable portion of the screw 33.

The driving member 4, as shown in FIGS. 1 to 3, includes a motor 40 with a decelerator, the driving roller 41, the pinch roller unit 42 and a controller (not shown). The motor 40 is bolted together to the mounting plate 10 of the motor supporting member 1a. The driving roller 41 is attached on the output shaft of the motor 40 with the decelerator. The pinch roller unit 42 is attached on the unit mounting plate 13. The controller is to change the rotation of the output shaft of the motor 40 with the decelerator by changing the frequency.

The pinch roller unit 42, as shown in FIGS. 2 and 4, holds the beaded conveyor belt 2 between the pinch roller 42a and the driving roller 41 to reliably rotate and drive the beaded conveyor belt 2 by the friction engagement. This pinch roller unit 42 is constituted so as to adjust the force for holding the beaded conveyor belt 2 between the pinch roller 42a and the driving roller 41. Separation of the pinch roller 42a from the driving roller 41 allows to release the holding engagement of the beaded conveyor belt 2.

The motor 41 with the decelerator, the driving roller 41 and the controller are already known, and will not be described here in detail.

The cover 5 includes, as shown in FIGS. 1 and 2, an inner peripheral side cover 5a and an outer peripheral side cover 5b.

The inner peripheral side cover 5a, as shown in FIG. 1, is formed in a fan shape so as to cover the inner peripheral edge area of the beaded conveyor belt 2 and the vicinity thereof. The cover 5a is screwed together to an upper portion 61a of the leg member 61 through a manually rotatble cover attaching screw 50 as shown in FIG. 2.

The outer peripheral side cover 5b, as shown in FIG. 1, is shaped so as to cover the outer periphery edge area of the beaded conveyor belt 2 and the vicinity thereof, i.e., formed in a shape to cover the bead composing elements 2b, the upper guide member 30, the press member 32, the screw 33, the motor 40 with the decelerator, the controller and the like. The cover 5b is attached to the vertical part 14b of the belt mounting plate 14 through a manually rotatable cover attaching screw 50.

The leg member 6, as shown in FIGS. 2 and 3, includes a leg portion 60 in an up-side-down T-shape formed by fixing a pillar 60a to the center of a horizontal beams 60b, a leg portion 61 of one pillar, a horizontal beam 62 connecting the leg portion 61 and the pillar 60a, and foot portions 63, 63 and 63 with height adjustable screws attached on the both ends of the horizontal beam 60b and the bottom portion of the leg portion 61. The outer side portion of the belt having the motor 40 with the decelerator and the like is supported by the leg portion 60, while the inner side portion of the belt on the belt mounting plate 14 is supported by the leg portion 61.

Here, when the cover attaching screw 50 is removed, the upper portion 61a of the leg portion 61 can be rotated down with a hinge T.

The conveyor belt 2 with bead is attached to the conveyor body 1 as follows.

As shown in FIG. 4, the beaded conveyor belt 2 is stretched between the end rollers 15 and 15 so as to maintain a certain rotation track by the belt mounting plate 14, the two belt guide plates 16 and 16, the driving roller 41 and the pinch roller 42a.

Furthermore, as described above, the conveyor belt 2 is stretched between the end rollers 15 and 15, and, in this state shown in FIGS. 1, 3 and 5, the inner slant faces of the thick portions of a number of bead composing elements 2b (function as a bead member) on the belt 2 are in contact with the upper and lower guide members 30, 31 and 31.

Therefore, when the motor 40 with the decelerator is driven, the beaded conveyor belt 2 rotates as being caught and held between the driving roller 41 and the pinch roller 42a. And the bead composing elements 2b forward sliding on the upper and lower side guide members 30, 31 and 31 in the above mentioned contact state therewith. Consequently, the conveyor belt 2 is prevented from inward shifting. Namely, the bead member composed of a number of bead composing elements 2b exhibits the same function as a continuously formed bead.

The beaded conveyor belt 2 may be removed from the conveyor main body 1 with the following steps (1) to (5).

(1) Release the manually operable screw 50 for mounting the cover, and remove the inner side cover 5a and the outer side cover 5b (2) Rotate down the upper portion 61a of the leg member 61 with the hinge T from a position shown by continuous line to another position shown by two-dot chain line in FIG. 2

(3) Loose the manually operable (rotatable) screw 33 to remove the upper and lower guide members 30, 31 and 31 received within the groove 32a from the press member 32

(4) Separate the pinch roller 42 away from the driving roller 41 to release the conveyor belt 2 being held therebetween (5) After the above steps (1) to (4), shift the beaded conveyor belt 2 inwardly (from the outer peripheral side toward the inner peripheral side) so that the beaded conveyor belt 2 may be removed from the conveyor main body 1

(6) When attaching the beaded conveyor belt 2 on the conveyor main body 1, take the above steps reversely.

As stated above, in the constitution of this beaded conveyor belt 2; (1) the bead member is composed of a number of bead composing elements 2b disposed on across the entire outer peripheral area of the belt main body 2a, (2) the width (in the belt forwarding direction) of each bead composing element 2b is as narrow as about 20 to 60% of the diameter of the straight end roller 15 having a small diameter, and (3) the adjacent bead composing elements 2b and 2b are separated from each other, or are connected with a thin piece 20c. Therefore, compared with the conveyor belt with bead in the prior art section, in this conveyor belt 2 with bead, extremely less crack and/or breakage may occur in the beat composing elements 2b, and thereby the belt 2 withstand the long time use.

Alternatively, for example, in case bead composing elements 2b are pinned or sewed together with the belt body 2a, when one or some of the bead composing elements 2b are damaged, the one or some of them may be easily replaced. That is, even if one or some of the bead composing elements 2b are damaged, the conveyor belt may be continuously used only by replacing the damaged bead composing elements 2b.

Advantageous features of the belt body 2a are described below.

The joint portion (i.e. a radial end portion of the fan-shaped sheet S) is formed by one time press cut with a Thompson blade, and this allows a small number of manufacturing steps and a low manufacturing cost.

Furthermore, the belt body 2a has a finger joint from the inner peripheral end to near the outer peripheral end, and the other area from the portion to be held between the driving roller 41 and the pinch roller 42a and the vicinity thereof up to the outer peripheral end is a joint of straight cut lines L each of which has a large angle α2 with respect to the contact line L on the peripheral direction line of the belt. Therefore, twisting load due to the change in the peripheral speed by the driving roller 41, the belt body 2a and the pinch roller 42a and inwardly shifting force of the belt body 2a may be prevented by the shift prevention member 3. And, as a result, even if pull force in a width (radial) direction of the belt body 2a is occurred, detachment and breakage hardly occurs at a portion indicated with the numeral 27 of the belt body 2a.

The end portions of the fan-shaped sheet S are practically joined together with a finger joint, and the joined portion will not become thicker like those in the skiving joint or the step joint.

The effects of using the end roller 15 are as follows. The end roller 15, as shown in FIG. 1, is formed with the axial piece 15a and a plurality of resin rollers 15b rotatably provided thereon. And the bearing 15c (which has the same diameter as or a larger diameter than the outer diameter of the resin roller 15b) is provided between the adjacent resin rollers 15b and 15b located on the belt outer peripheral side. Therefore, in the outer peripheral area of the belt where the peripheral speed of the belt body 2a is rather large, the belt body 2a forwards along with the rotation of the outer lace of the bearings 15c, while in the inner peripheral area of the belt where the peripheral speed of the belt body 2a is small, the belt body 2a forwards along with the rotation of the resin rollers 15b. Therefore, in the outer peripheral area with a larger peripheral speed, harsh friction noises may be extremely suppressed as compared with the case using end rollers having no bearings 15c, or eliminated.

Figure 13:
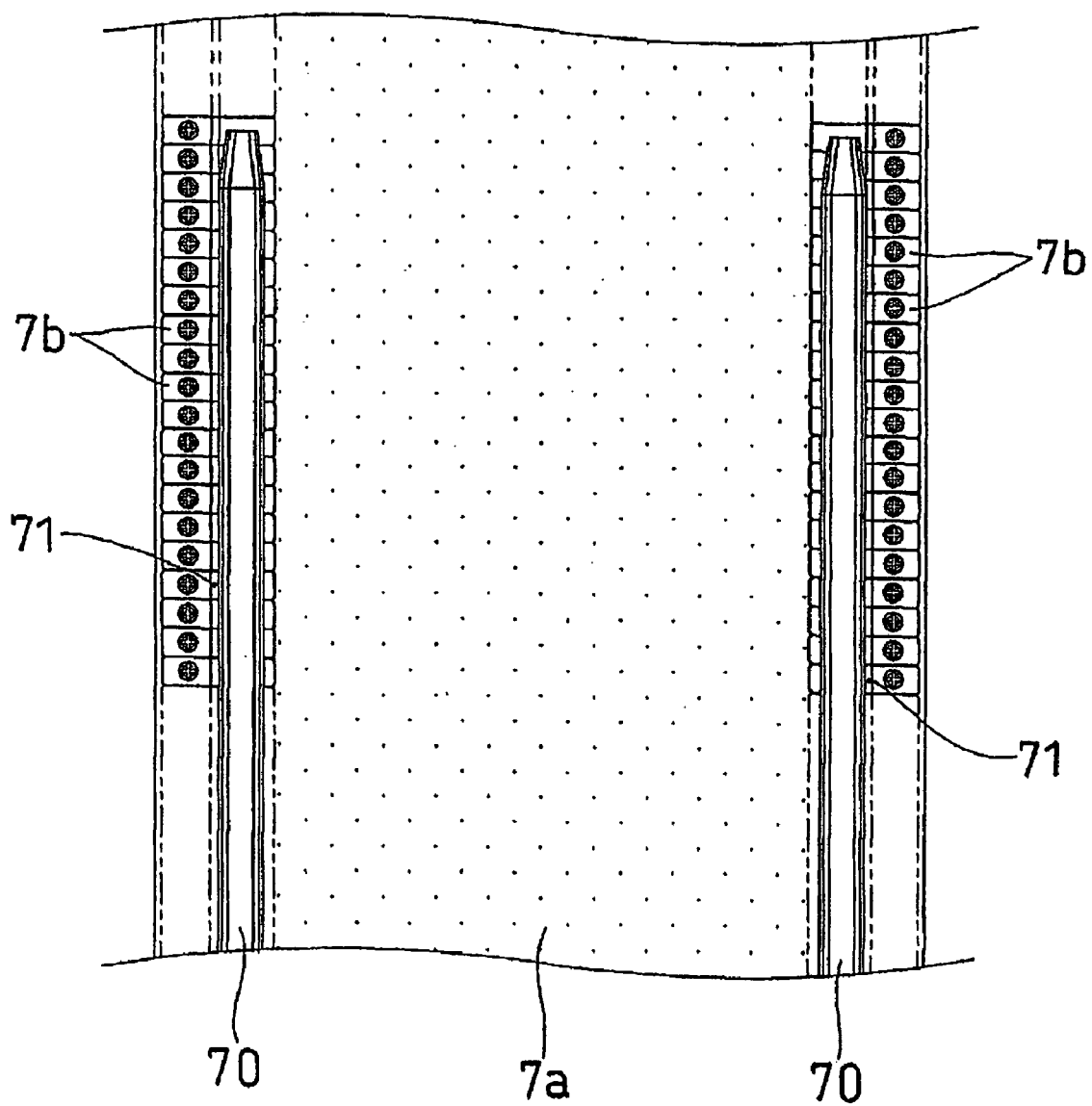
FIG. 13 is a plan view showing a state in which bead composing elements are provided on both sides of a straight conveyor belt.
Figure 14:
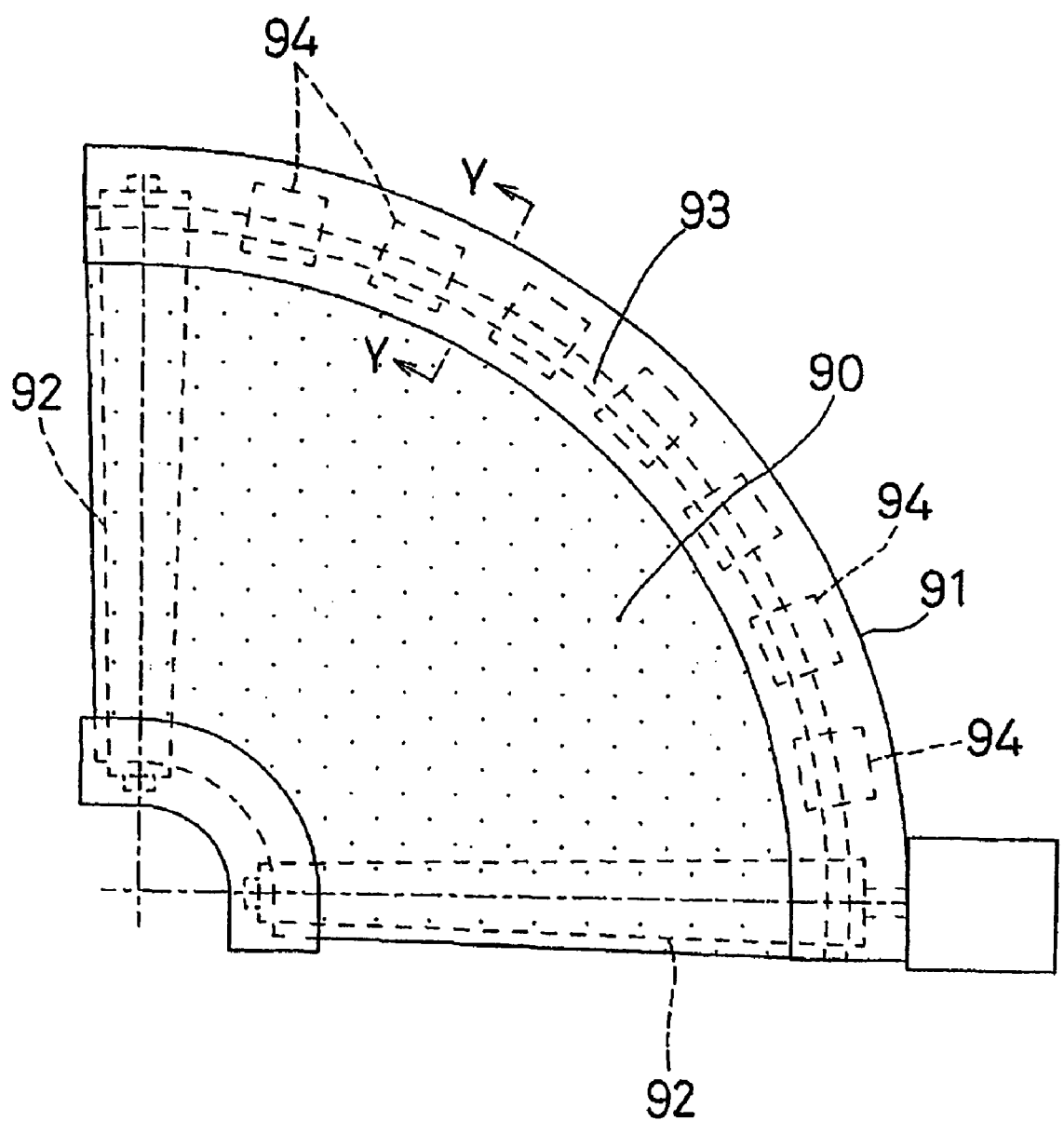
FIG. 14 is a plane view of a conventional curved conveyor.
Figure 15:
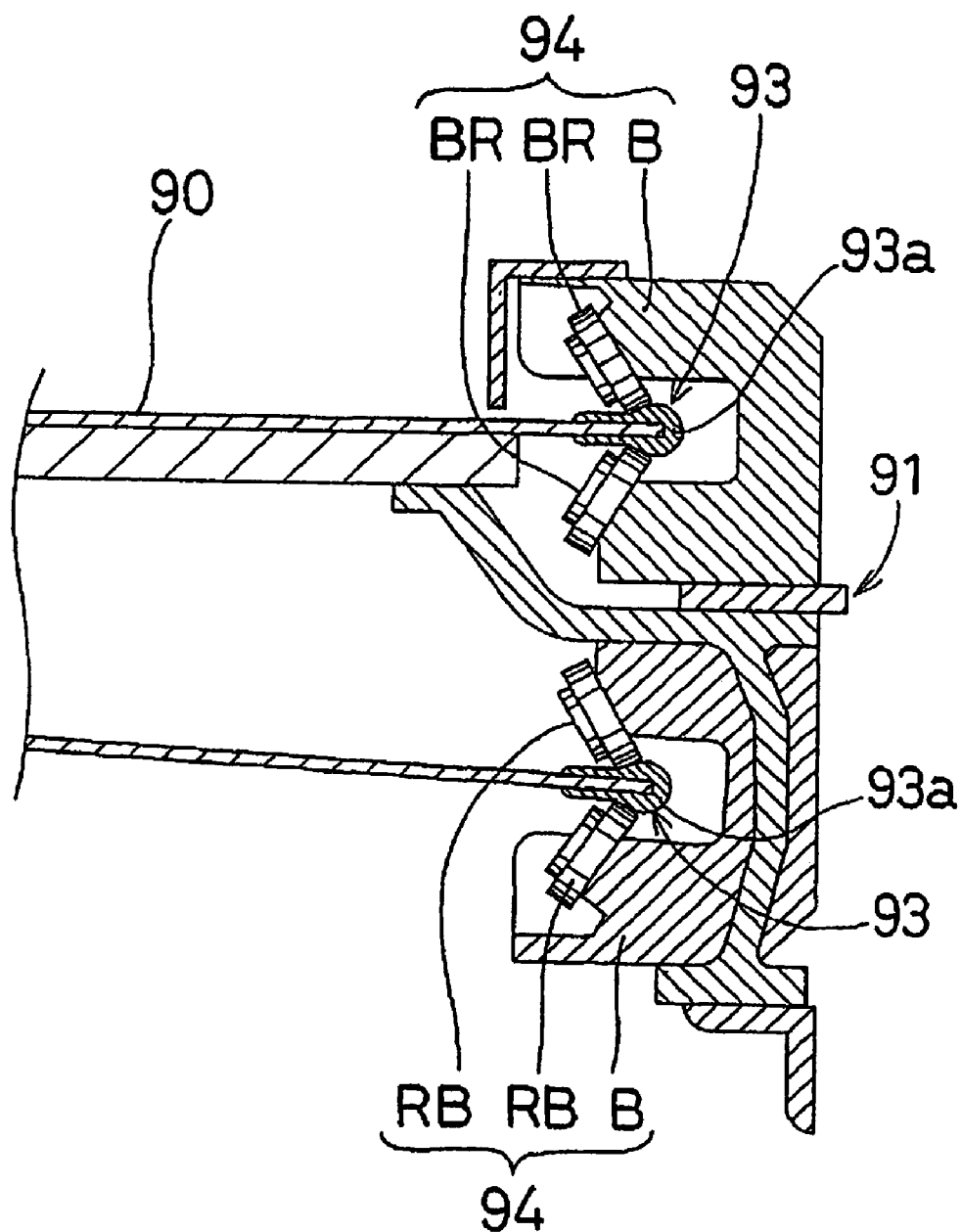
FIG. 15 is a sectional view of FIG. 14 taken along the line Y—Y.
Figure 16:
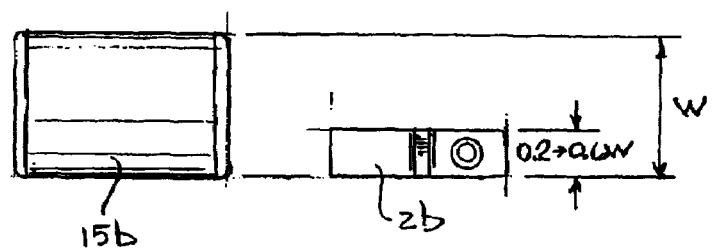
FIG. 16 is a perspective view of the width of a bead composing element relative to the straight end roller.
Figure 17:
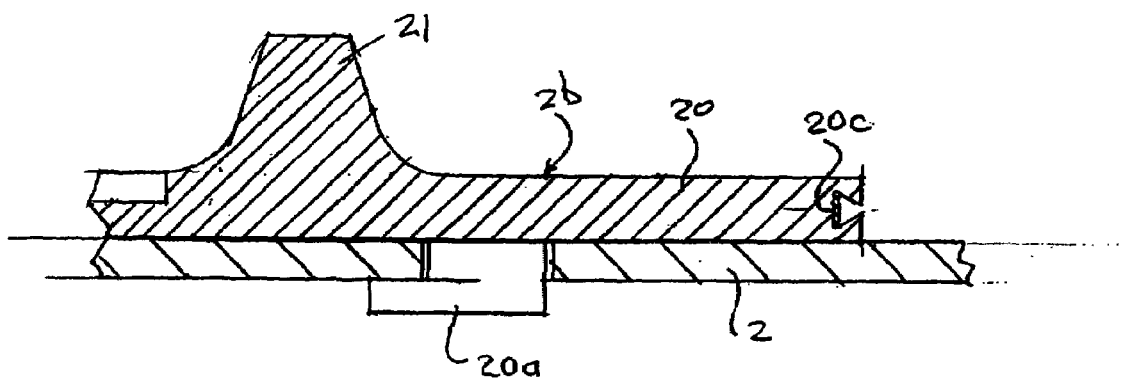
FIG. 17 is a sectional view showing a state in which a bead composing element is attached on the belt body and to other bead composing elements.

In the above embodiment, the aspect of the present invention is applied to a curved conveyor belt; however, this is not limitative thereto. Another embodiment is shown in FIG. 13 in which an aspect of the present invention is applied to a straight conveyor. A belt body 7a of the straight conveyor has a plurality of bead composing elements 7b, which have a similar structure to that of the above mentioned bead composing elements 2b, at both ends. Straight guide members 70 and 70 are disposed on the conveyor body and are in contact with the inside slant faces of thick portions 71 and 71 of the bead composing elements 7b and 7b. In this structure, not only meander forwarding of the bolt body 7a may be prevented, but also, if one or more of the bead composing elements 7b are damaged, replacement of the damaged bead composing elements and restoration of the system could be easily done.

In the foregoing embodiments, the thick portions 21 and 71 of the bead composing elements 2b and 7b are shaped in a trapezoid in a side view. The shape is not limitative thereto, but may be rectangular, square, triangle or the like.

Having the construction stated above, the present invention may provide a conveyor belt with bead which may be used for a long term period even if the belt is stretched between small diameter end rollers.

The invention claimed is:

1. A beaded conveyor belt for a straight conveyor having a belt body and a bead member, the belt being stretched between two end rollers disposed in parallel, the bead member being formed with a plurality of narrow bead composing elements which are disposed along entire edge portions at both sides of the belt body, means to reduce at least one of cracking, breaking and noise production wherein a width of each bead composing elements is as narrow as 20 to 60% of the straight end rollers.

2. The beaded conveyor belt according to claim 1, wherein any adjacent bead composing elements are disposed separately.

3. The beaded conveyor belt according to claim 1, wherein any adjacent bead composing elements are connected through a thin piece.

4. The beaded conveyor belt according to claim 1, wherein each of the bead composing elements has a thick portion for preventing inward shift of the belt body by engaging with a guide member provided on a body of the conveyor.

5. The beaded conveyor belt according to claim 2, wherein each of the bead composing elements has a thick portion for preventing inward shift of the belt body by engaging with a guide member provided on a body of the conveyor.

6. The beaded conveyor belt according to claim 3, wherein each of the bead composing elements has a thick portion for preventing inward shift of the belt body by engaging with a guide member provided on a body of the conveyor.

7. The beaded conveyor belt according to claim 4, wherein a diameter of the small-diameter straight end rollers is about 15 to 30 mm.

8. The beaded conveyor belt according to claim 5 wherein a diameter of the small-diameter straight end rollers is about 15 to 30 mm.

9. The beaded conveyor belt according to claim 6, wherein a diameter of the small-diameter straight end rollers is about 15 to 30 mm.

* * * * *